United States Patent Office 3,788,949
Patented Jan. 29, 1974

3,788,949
STERILITY TESTING ANTIGEN PRODUCTS
Katsuto Kojiro and Robert A. Elliott, Indianapolis, Ind., assignors to Eli Lilly and Company, Indianapolis, Ind.
No Drawing. Filed Aug. 22, 1972, Ser. No. 282,791
Int. Cl. C12k 1/10
U.S. Cl. 195—100
6 Claims

ABSTRACT OF THE DISCLOSURE

We have discovered an improved method of sterility testing antigen products containing thimerosal which comprises the addition of a thimerosal-inhibiting concentration of penicillamine or the acid addition salts thereof to the growth medium in which the antigen product is cultured for sterility testing.

BACKGROUND OF THE INVENTION

Penicillamine, $\alpha$-amino - $\beta$ - methyl-$\beta$-mercaptobutyric acid, is a well-known degradation product of the penicillins. Merck Index, 8th ed., p. 789 (1968).

Ever since the pioneer work of Pasteur, biological antigen products have been produced and used for the immunization of people and animals against diseases and for immunological testing. Such antigen products are produced by growth of microorganisms in appropriate growth media.

It has long been known that the media in which antigens are grown allow growth of "wild" organisms as well as the desired organisms. Therefore, one of the major problems in the production of antigens has always been maintaining the desired organism free of wild microorganisms. Great care is taken in the production of antigens to avoid the introduction of wild organisms, and microbiocidal substances are added to the finished antigen to kill or inhibit the growth of any wild organisms which may have crept in.

One of the most satisfactory microbiocidal substances for such use is thimerosal, [(o-carboxyphenyl)thio]-ethyl-mercury sodium salt. Thimerosal is added to a large number of antigen products in concentrations of about 1:10,000 (one weight part of thimerosal to 10,000 weight parts of antigen product) to about 1:20,000.

Thimerosal, however, causes difficulty when the antigen product is tested to assure that it is free of wild organisms. The only way to conduct such sterility tests is by inoculation of the antigen product into a suitable growth medium, storage at conditions favorable to the growth of microorganisms, and observation to determine if any wild organisms grow out. Thimerosal, of course, inhibits the growth of any wild organisms which may be present so that they are not observed in the sterility test, with the result that a contaminated antigen product may be accepted as sterile.

In order to prevent thimerosal from inhibiting the wild organism's growth, it is routine to dilute the antigen product in an appropriate growth medium until the thimerosal content is reduced to about 1:50,000,000. In other words, 1 ml. of the antigen is diluted in about 5,000 ml. of growth medium. Since the medium must be carefully prepared and sterilized, the medium used in this way represents a substantial cost.

Therefore, a substance which could inhibit the action of thimerosal, so that antigen sterility testing could be performed without diluting the product in so much growth medium, would be highly desirable. It has been known that compounds containing the —SH group will inhibit thimerosal to some extent. Lawrence and Block, Disinfection, Sterilization, and Preservation, p. 354 (Lea and Febiger, 1968). Previously-known inhibiting compounds, such as cysteine, were not sufficiently effective to be used in a test as critical as the antigen sterility test.

SUMMARY

We have discovered improved growth media for the testing of antigen products containing thimerosal which include a thimerosal-inhibiting concentration of penicillamine or the acid addition salts thereof in the growth media. Addition of penicillamine inhibits thimerosal so that wild organisms grow and are observed during the test. We have also discovered an improved method of sterility testing which makes use of our improved growth media.

DESCRIPTION OF THE PREFERRED EMBODIMENT

The addition of penicillamine to the growth medium used in the sterility testing of antigen products containing thimersol inhibits the microbiocidal effect of thimerosal. Penicillamine is more effective, and more consistently effective, in inhibiting thimerosal than are other mercapto compounds. It is quite surprising to find one compound so much more effective than other compounds apparently similar.

Penicillamine may be used in the practice of our method, and in our growth media, as the base, or as its acid addition salts. Exemplary useful acid addition salts include the hydrobromide, nitrate, phosphate, sulfate, and toluenesulfonate. The preferred form in which to use penicillamine in our method is the hydrochloride, because of its high water solubility. The term "penicillamine" will be used in the following specification and claims to include penicillamine and its acid addition salts.

The antigen products to which sterility tests must be applied before release for use by the medical professions include immunizing biologicals of bacterial and viral origin, toxins, toxoids, and antitoxins, test preparations such as the diphtheria skin-test toxin and the mumps skin-test antigen, and immunizing products containing mixtures of antigens. For example, the following well-known antigen products are subject to the requirement of a sterility test.

catarrhalis vaccine
diphtheria and tetanus combined toxoids
influenza vaccines
mumps vaccine
pertussis vaccine
rabies vaccine
staphylococcus vaccine
streptococcus vaccine
tetanus toxoid
diphtheria, tetanus, and pertussis combined vaccine
typhus vaccine
typhoid vaccine
B-virus vaccine
Herpes simplex vaccine
respiratory bacterial antigen
staphylococcus-streptococcus bacterial antigen
cholera vaccine
measles vaccine smallpox vaccine
typhoid antigen
*Clostridium perfringens* toxoid
leptospira vaccine
tetanus antitoxin
feline panleucopenia vaccine Our improved method of sterility testing is applicable to the above examples and to all antigen products which contain thimerosal.

A sterility test is conducted by diluting the antigen product to be tested in an appropriate growth medium and observing for growth of wild microorganisms in the growth medium during a growth period at suitable conditions. Our improved method of sterility testing is effective in any of the growth media which are useful in sterility testing. Any of such useful growth media are usable as the basis of our improved growth media.

In general, growth media useful for sterility testing comprise available water-soluble sources of carbon, nitrogen, and inorganic salts. Meat infusions, yeast extract, peptones, sugars, and enzymatic digests of natural proteins are satisfactory sources of utilizable carbon and nitrogen. For example, dextrose, beef muscle extract, heart extract, papaic digest of soybean protein, pancreatic digest of casein, peptic digests of muscle and digests of gelatin are used. Inorganic salts may be supplied as trace impurities in the other ingredients or as the pure salts.

For example, the following growth media are accepted for sterility testing by the responsible governmental agencies.

FLUID THIOGLYCOLLATE MEDIUM

| | | |
|---|---|---|
| l-cystine | g | 0.5 |
| Sodium chloride | g | 2.5 |
| Dextrose | g | 5.5 |
| Granular agar (less than 15 percent moisture by weight) | g | 0.75 |
| Water-soluble yeast extract | g | 5.0 |
| Pancreatic digest of casein | g | 15.0 |
| Sodium thioglycollate | g | 0.5 |
| Resazurin (0.1 percent solution) | ml | 1.0 |
| Water | ml | 1,000 |

SOYBEAN CASEIN DIGEST MEDIUM

| | | |
|---|---|---|
| Pancreatic digest of casein | g | 17 |
| Papaic digest of soybean meal | g | 3.0 |
| Sodium chloride | g | 5.0 |
| Dibasic potassium phosphate | g | 2.5 |
| Dextrose | g | 2.5 |
| Water | ml | 1,000 |

The following growth media are exemplary of growth media which are useful for sterility testing, and which are useful, although not accepted by the regulatory agencies, in the practice of our improved method of sterility testing.

ALTERNATE THIOGLYCOLLATE MEDIUM

| | | |
|---|---|---|
| l-cystine | g | 0.5 |
| Sodium chloride | g | 2.5 |
| Dextrose | g | 5.5 |
| Water-soluble yeast extract | g | 5.0 |
| Pancreatic digest of casein | g | 15.0 |
| Sodium thioglycollate | g | 0.5 |
| Water | ml | 1,000 |

FLUID SABOURAUD MEDIUM

| | | |
|---|---|---|
| Dextrose | g | 20 |
| Pancreatic digest of casein | g | 5 |
| Peptic digest of animal tissue | g | 5 |
| Water | ml | 1,000 |

NUTRIENT MEDIUM

| | | |
|---|---|---|
| Beef extract | g | 3 |
| Peptone | g | 5 |
| Purified water | ml | 1,000 |

BRAIN HEART INFUSION MEDIUM

| | | |
|---|---|---|
| Calf brains, infusion from | g | 15.80 |
| Beef heart, infusion from | g | 19.70 |
| Proteose or gelysate pancreatic digest of gelatin | g | 0.79 |
| Dextrose | g | 0.16 |
| Sodium chloride | g | 0.40 |
| Disodium phosphate | g | 0.20 |
| Water | ml | 1,000 |

TRYPTONE AZOLACTIN TWEEN 20 MEDIUM

| | | |
|---|---|---|
| Pancreatic digest of casein | g | 20 |
| Azolactin | g | 5 |
| Tween 20 (polyoxyethylene sorbitan ester) | ml | 40 |
| Water | ml | 960 |

HEART INFUSION MEDIUM

| | | |
|---|---|---|
| Beef heart infusion | g | 25 |
| Yeast extract | g | 10 |
| Proteose or gelysate pancreatic digest of gelatin | g | 10 |
| Water | ml | 1,000 |

Our improved method is effective in any growth medium suitable for sterility testing, including those exemplified above. Those skilled in the art are well able to choose a growth medium for a given test; usually the medium is specified by a regulatory agency.

A sterility test according to our improved method is performed by adding a small amount of the antigen product to be tested, and a small amount of penicillamine, to a comparatively large amount of a growth medium such as those exemplified above. The advantage of our improved method lies in the reduction of the necessary ratio between the quantity of antigen product and the quantity of growth medium used in the test.

The most thimerosal-sensitive wild organism known is *Aspergillus niger*, and so the necessary dilution of the antigen product has been determined by the use of that microorganism as an indicator. A conventional test, without the use of penicillamine, is performed by diluting the antigen product in the growth medium so that the thimerosal concentration in the growth medium is about 1:50,000,000. *A. niger* will grow in medium containing that concentration of thimerosal. If the antigen product contains the common concentration of 1:10,000 of thimerosal, it is necessary to dilute 1 ml. of the antigen product in 5 liters of expensive, sterile growth medium.

The use of penicillamine according to our improved method of sterility testing allows a surprisingly great decrease in the dilution of the antigen product and therefore in the amount of growth medium used. *A. niger* will grow in growth medium containing a suitable concentration of penicillamine in the presence of concentrations of thimerosal less than about 1:800,000. These concentrations are equivalent to a dilution of 1 ml. of antigen product, containing 1:10,000 of thimerosal, in at least about 80 ml. of growth medium. It is preferable to dilute the antigen product in the growth medium so that the thimerosal content of the growth medium is from about 1:800,000 to about 1:10,000,000.

The novel feature of our improved method of sterility testing is the addition of a thimerosal-inhibiting concentration of penicillamine to the growth medium in which the antigen product is cultured. The preferred range of concentrations of penicillamine is from about 0.05 percent to about 0.5 percent. "Percent" here means "grams per 100 milliliters." The upper limit of 0.5 percent penicillamine is the approximate maximum that can be added without causing some inhibition of some sensitive wild organisms by the penicillamine itself. The lower limit of penicillamine concentration varies somewhat with the permissible thimerosal concentration in the growth medium. If a high dilution of the antigen product, and therefore a low concentration of thimerosal is acceptable, then a low concentration of penicillamine will be adequate. The optimum range of pencillamine concentrations in the usual applications of our method is from about 0.15 percent to about 0.25 percent.

Those skilled in the microbiological art will appreciate that penicillamine concentrations outside the preferred range are useful in inhibiting thimerosal in specific instances, depending on the growth medium chosen and the particular wild organisms of concern in the antigen product.

Our improved growth media for sterility testing comprise thimerosal-inhibiting concentrations of penicillamine and growth media suitable for sterility testing. Our improved growth media are novel because of the presence of penicillamine. The growth media on which our improved growth media are based are those which are well known in the microbiological art and include, while by no means being confined to, the growth media exemplified above.

The preferred and the optimum rangs of concentrations of penicillamine in our improved growth media are the same as the corresponding concentrations used in our improved method of testing.

We have shown the effectiveness of our improved method of sterility testing by controlled scientific tests. In all of the tests to be reported below, the test organism was *Aspergillus niger,* because of its very high sensitivity to thimerosal. The concentration of *A. niger* in the cultures is expressed as the titer, the reciprocal of the log to the base 10 of the maximum dilution in which the culture could be used to inoculate fresh sterile medium.

PAM is used as an abbreviation of penicillamine.

Example 1

This test was conducted in order to prove the effectiveness of penicillamine in inhibiting the effect of thimerosal. The growth medium used was fluid thioglycollate medium, the formula of which is shown above. The medium was sterilized by autoclaving at 15–17 p.s.i.

Penicillamine was supplied as a 20 percent by weight solution of penicillamine hydrochloride in water. The solution was sterilized by ultrafiltration.

Controlled contaminations of *A. niger* were added to the test cultures from a stock suspension containing *A. niger* at a titer of about 6. The fungus was always added to the growth medium after the thimerosal and penicillamine were added.

Penicillamine hydrocholride at 0.1 percent and 0.2 percent was tested against thimerosal concentrations from 1:400,000 to 1:4,000,000. Positive controls for penicillamine and thimerosal were included. Each combination of penicillamine and thimerosal concentrations was added to 12 tubes of growth medium. The tubes were divided into four groups of three tubes each. Amounts of *A. niger* suspension were added to the tubes which provided *A. niger* concentrations in the four groups of tubes, respectively, of $10^{-3}$, $10^{-4}$, $10^{-5}$, and $10^{-6}$ of the concentration of the stock suspension.

The tubes were allowed to grow for 14 days at 20–25° C. At the end of that time, the tubes were observed for growth of *A. niger,* and the titer was calculated by the method of Reed and Muench, which computes the titer from the observed ability of the various concentrations of fungus to grow.

The results of the test, which was replicated twice, are shown below. A dash indicates that the individual combination of thimerosal and penicillamine was not tested.

| Thimerosal concentration | 0.1% PAM | | 0.2% PAM | |
|---|---|---|---|---|
| | Replicate 1 | Replicate 2 | Replicate 1 | Replicate 2 |
| 0 | 6.5 | 5.5 | 6.5 | 5.5 |
| 1:1,000,000 (no PAM) | <3.5 | ---- | <3.5 | ---- |
| 1:4,000,000 (no PAM) | ---- | <2.5 | ---- | <2.5 |
| 1:400,000 | <3.5 | ---- | 5.0 | ---- |
| 1:800,000 | 5.0 | <2.5 | 5.5 | 4.5 |
| 1:1,000,000 | 5.0 | 4.0 | 5.5 | 5.0 |
| 1:2,000,000 | ---- | 5.0 | ---- | 5.0 |
| 1:4,000,000 | ---- | 5.0 | ---- | 5.0 |

The above data show that 0.1 percent penicillamine is sufficient under these conditions to inhibit a thimerosal concentration of 1:1,000,000 in a majority of individual cultures. A concentration of 0.2 percent of pencillamine inhibits a concentration of 1:1,000,000 of thimerosal in all of the culture tubes, providing a reliable test with a lesser volume of medium. When the thimerosal is inhibited, the inoculated *A. niger* grows to a normal titer so that it can be definitely identified as a contaminating organism in the antigen product.

Example 2

A number of organisms were cultured, for 14 days at 30–32° C., in the case of bacteria, or at 20–25° C. for fungi, in sterile fluid thioglycollate medium, and in the same medium containing 0.2 percent penicillamine in order to assure that the penicillamine did not inhibit the growth of the organisms. The results are shown below.

| Test organism | Organism titers | |
|---|---|---|
| | Positive control | 0.2% PAM |
| *S. aureus* | 9.0 | 9.5 |
| *B. subtilis* | 7.0 | 7.5 |
| *B. vulgatus* | 7.0 | 8.0 |
| *P. aeruginosa* | 8.5 | 8.5 |
| *C. albican* | 6.5 | 5.5 |
| *S. cerevisiae* | 7.0 | 7.0 |
| *P. notatum* | 6.5 | 6.5 |
| *A. niger* | 6.0 | 6.0 |

The results of this test prove that penicillamine is not inhibitory to representative microorganisms such as may be found in antigen products.

The tests reported in the examples below are sterility tests of actual antigen products to which contaminating *A. niger* cultures have been added.

Example 3

A diphtheria, pertussis and tetanus combined vaccine, containing a thimerosal concentration of 1:10,000, was sterility tested with added *A. niger* inoculation. Four sets of twelve culture tubes of fluid thioglycollate medium were prepared. Twelve tubes were held as blank controls. To each of another 12 tubes was added 0.2 percent of penicillamine hydrochloride as positive controls. To each of a third group of 12 tubes was added 1 ml. of the vaccine, giving a thimerosal concentration of 1:1,000,000. To each of a fourth group of 12 tubes was added 1 ml. of the vaccine and 0.2 percent of penicillamine hydrochloride.

Each set of 12 tubes was divided into groups of three, and *A. niger* suspension was added to the tubes as in Example 1. Growth and calculation of the titer proceeded as in Example 1.

Four tests were performed with different lots of vaccine. The results are shown below.

| | Test 1 | Test 2 | Test 3 | Test 4 |
|---|---|---|---|---|
| Blank control | 5.5 | 5.5 | 5.5 | 6.0 |
| Positive control | 5.5 | 5.5 | 5.5 | 5.5 |
| Vaccine added | <3.5 | <3.5 | 3.0 | 3.5 |
| Vaccine plus PAM added | 5.5 | 4.5 | 5.0 | 5.0 |

Example 4

Tests similar to those of Example 3 were conducted with a fluid tetanus toxoid containing 1:10,000 thimerosal as the test vaccine. The results, using two lots of the antigen product, are shown below. The concentrations and procedure were the same as those of Example 3.

|  | Test 1 | Test 2 |
|---|---|---|
| Blank control | 5.5 | 5.5 |
| Positive control | 5.5 | 5.5 |
| Vaccine added | <3.5 | 3.5 |
| Vaccine plus PAM added | 4.5 | 6.0 |

Example 5

The procedure of Example 3 was repeated in the testing of three lots of influenza virus vaccine containing 1:10,000 of thimerosal. The results are shown below.

|  | Test 1 | Test 2 | Test 3 |
|---|---|---|---|
| Blank control | 5.5 | 5.5 | 6.0 |
| Positive control | 5.5 | 5.5 | 5.5 |
| Vaccine added | <3.5 | 3.5 | 3.5 |
| PAM plus vaccine added | 5.0 | 5.5 | 5.5 |

Example 6

Tests similar in every respect to the tests of Example 3 were performed on a typhoid vaccine containing 1:10,000 of thimerosal. The results are shown below.

|  | Test 1 | Test 2 | Test 3 |
|---|---|---|---|
| Blank control | 5.5 | 5.5 | 6.0 |
| Positive control | 5.5 | 5.5 | 5.5 |
| Vaccine added | <3.5 | <2.5 | <2.5 |
| Vaccine plus PAM added | 4.5 | 4.5 | 5.0 |

Example 7

The general procedure of Example 3 was repeated in testing a combined parainfluenza-3 virus vaccine and *Pasteurella multocida* and *Pasteurella haemolytica* bacterin containing 1:20,000 of thimerosal. The first two tests to be reported were conducted in soybean casein digest medium, using 40 ml. per tube. The thimerosal concentration in the growth medium therefore was 1:800,000. Penicillamine concentration was 0.2 percent. Two lots of the vaccine were tested.

|  | Test 1 | Test 2 |
|---|---|---|
| Blank control | 7.3 | 7.0 |
| Positive control | 6.7 | 6.5 |
| Vaccine added | <3.5 | <3.5 |
| Vaccine plus PAM added | 7.3 | 7.0 |

Two other lots of the same vaccine were tested in fluid thioglycollate medium, using both 40 ml. and 100 ml. tubes, containing respectively 1:800,000 and 1:2,000,000 of thimerosal. Penicillamine content was again 0.2 percent.

The results at 1:800,000 of thimerosal were as follows:

|  | Test 1 | Test 2 |
|---|---|---|
| Blank control | 5.5 | 6.0 |
| Positive control | 5.0 | 5.5 |
| Vaccine added | <2.5 | <2.5 |
| Vaccine plus PAM added | 4.5 | 5.5 |

The results at 1:2,000,000 of thimerosal were as follows.

|  | Test 1 | Test 2 |
|---|---|---|
| Blank control | 6.0 | 6.0 |
| Positive control | 5.5 | 5.5 |
| Vaccine added | <2.5 | <2.5 |
| Vaccine plus PAM added | 5.5 | 6.0 |

Example 8

The same general procedure was used in the testing of a combined infectious bovine rhinotracheitis virus and parainfluenza-3 virus vaccine and *Pasteurella multocida* and *Pasteurella haemolytica* bacterin containing 1:20,000 of thimerosal. The penicillamine concentration used was 0.2 percent in all tests. Three lots were tested at a dilution of 40 ml. of fluid thioglycollate medium, thimerosal concentration 1:800,000, and three lots were tested at a dilution of 100 ml. of fluid thioglycollate medium, equivalent to a thimerosal concentration of 1:2,000,000.

The results at 1:800,000 of thimerosal follow.

|  | Test 1 | Test 2 | Test 3 |
|---|---|---|---|
| Blank control | 7.0 | 5.5 | 6.0 |
| Positive control | 6.5 | 5.0 | 5.5 |
| Vaccine added | <3.5 | <2.5 | <2.5 |
| Vaccine plus PAM added | 6.0 | 5.5 | 5.0 |

The following results were at a thimerosal concentration of 1:2,000,000.

|  | Test 1 | Test 2 | Test 3 |
|---|---|---|---|
| Blank control | 6.0 | 6.0 | 6.0 |
| Positive control | 5.5 | 5.5 | 6.0 |
| Vaccine added | <2.5 | <2.5 | 3.5 |
| Vaccine plus PAM added | 6.5 | 5.5 | 5.5 |

All of the tests reported in Examples 3 through 8 show that penicillamine is highly effective in the inhibition of thimerosal in sterility testing. In each instance, the growth of the wild organism in the growth medium was severely reduced by the concentration of thimerosal brought into the sterility test system by the antigen product. In each instance, the addition of penicillamine according to our invention to the growth medium inhibited the thimerosal so that the wild organism grew approximately normally. Thus, the observer of the test, practicing our invention, could have observed the wild organism and learned that the antigen product under test was contaminated and unacceptable.

We claim:

1. An improved growth medium useful for sterility testing of antigen products containing thimerosal which comprises a growth medium suitable for sterility testing of antigen products and a thimerosal-inhibiting concentration of penicillamine or an acid addition salt thereof.

2. An improved growth medium of claim 1 in which the concentration of penicillamine or an acid addition salt thereof, is from about 0.05 percent to about 0.5 percent.

3. An improved growth medium of claim 2 in which the concentration of penicillamine or an acid addition salt thereof, is from about 0.15 percent to about 0.25 percent.

4. In the sterility testing of antigen products containing thimerosal, in which testing the antigen product is inoculated into a suitable growth medium, stored at conditions favorable to growth of microorganisms, and observed to determine if any organisms grow out, the improvement which comprises the inhibition of thimerosal by means of the use of an improved growth medium of claim 1.

5. A test of claim 4 in which an improved growth medium of claim 2 is used.

6. A test of claim 4 in which an improved growth medium of claim 3 is used.

References Cited

UNITED STATES PATENTS 3,715,281    2/1973    Martin et al. _____ 195—100 X

OTHER REFERENCES

Merck Index; 8th ed. pp. 789; 1040, 1968.

A. LOUIS MONACELL, Primary Examiner

R. J. WARDEN, Assistant Examiner

U.S. Cl. X.R.

195—103.5 R